United States Patent [19]

Gibbens, Jr.

[11] Patent Number: 5,012,508
[45] Date of Patent: Apr. 30, 1991

[54] TELEPHONIC SPEECH TRAINING DEVICE

[76] Inventor: Harry C. Gibbens, Jr., 11327 Louise Ave., Lynwood, Calif. 90262-3113

[21] Appl. No.: 429,622

[22] Filed: Oct. 31, 1989

[51] Int. Cl.⁵ .................................... H04M 11/00
[52] U.S. Cl. .................................... 379/52; 379/395
[58] Field of Search .............. 379/52, 395; 381/67, 381/60, 79; 340/407

[56] References Cited

U.S. PATENT DOCUMENTS

| | | | |
|---|---|---|---|
| 4,151,376 | 4/1979 | Walker, Jr. | 379/395 |
| 4,773,088 | 9/1988 | Matheny | 379/52 |
| 4,837,832 | 6/1989 | Fanshel | 381/69 |
| 4,926,459 | 5/1990 | Advani et al. | 379/52 |

Primary Examiner—Jin F. Ng
Assistant Examiner—Ahmad F. Matar
Attorney, Agent, or Firm—Erik M. Arnhem

[57] ABSTRACT

A telephonic therapy training device usable by speech-impaired persons and/or hearing-impaired persons to improve their telephone usage skills. The device is a "learn-by-doing" device wherein the instructor and each student are provided with individual handsets, each of which includes a microphone and a speaker (receiver). Each voice signal is sent through a microphone into an individual amplifier that transmits an amplified signal to an opposite party receiver in the individual handsets. The training device operates on regular household current; the use of commercial telephone lines is avoided in order to escape telephone service fees.

2 Claims, 3 Drawing Sheets

TELEPHONIC SPEECH TRAINING DEVICE

BACKGROUND AND SUMMARY OF THE INVENTION

This invention relates to a telephonic therapy device for speech-impaired persons and/or hearing impaired persons. An aim of the invention is to help such persons become proficient in the use of telephones.

There are currently in use telecommunication devices for helping deaf people to communicate via the telephone. One such telecommunication device comprises an alphabetical keyboard electronically (acoustically) connected to a telephone and to a display screen in front of the human making the telephone call. A similar screen and keyboard are located at the receiving party's telephone. Each party can type a message on his/her keyboard; that message is sent over the telephone lines to the other party, such that the message simultaneously appears on both display screens. The two people can carry on a conversation by typing what each has to say on his/her keyboard.

Unfortunately telecommunication devices for the deaf (termed TDDs) are relatively costly and require some training on the part of hearing-impaired persons before such persons can become proficient in their use. Such training is relatively costly because it involves protracted use of commercial telephone lines, with correspondingly high service charges. Also, such communication devices require that the persons using the devices acquire skills in grammar, spelling, vocabulary and sentence structure in order for the person to effectively convey his/her message to the other person. Often the hearing-impaired person lacks the necessary skills to make full use of the telecommunication devices.

The present invention concerns a training device usable by hearing-impaired or speech-impaired persons so that they can upgrade their skills sufficiently for them to use the above-described telecommunication devices for the deaf or conventional telephones, respectively. The training device comprises two or more telephone handsets electrically interconnected so that a voice signal initiated at one handset is amplified during transmission of the signal to the other handset(s). The training device operates on household current, not the telephone lines. Therefore, operating costs for the training device are relatively low.

In use of the training device for the speech-impaired, a speech therapist (instructor) speaks a message into one of the telephone handsets; the student(s) listen to the message and repeat it back to the instructor, using the other telephone handset(s). Various messages and voice responses go back and forth between the handsets, such that over time the students gain proficiency in word comprehension and vocal annunciation. For hearing-impaired, an instructor types a message on the above-described telecommunication device for the deaf. A student types a message to the instructor.

The training device will help the speech-impaired and/or hearing-impaired to improve their telephone skills without actually requiring the use of commercial telephone lines. The amplifier within the training device enables the hearing-impaired to make effective meaningful use of the training device.

THE DRAWINGS

DESCRIPTION OF A PREFERRED EMBODIMENT OF THE INVENTION

Figure 1:
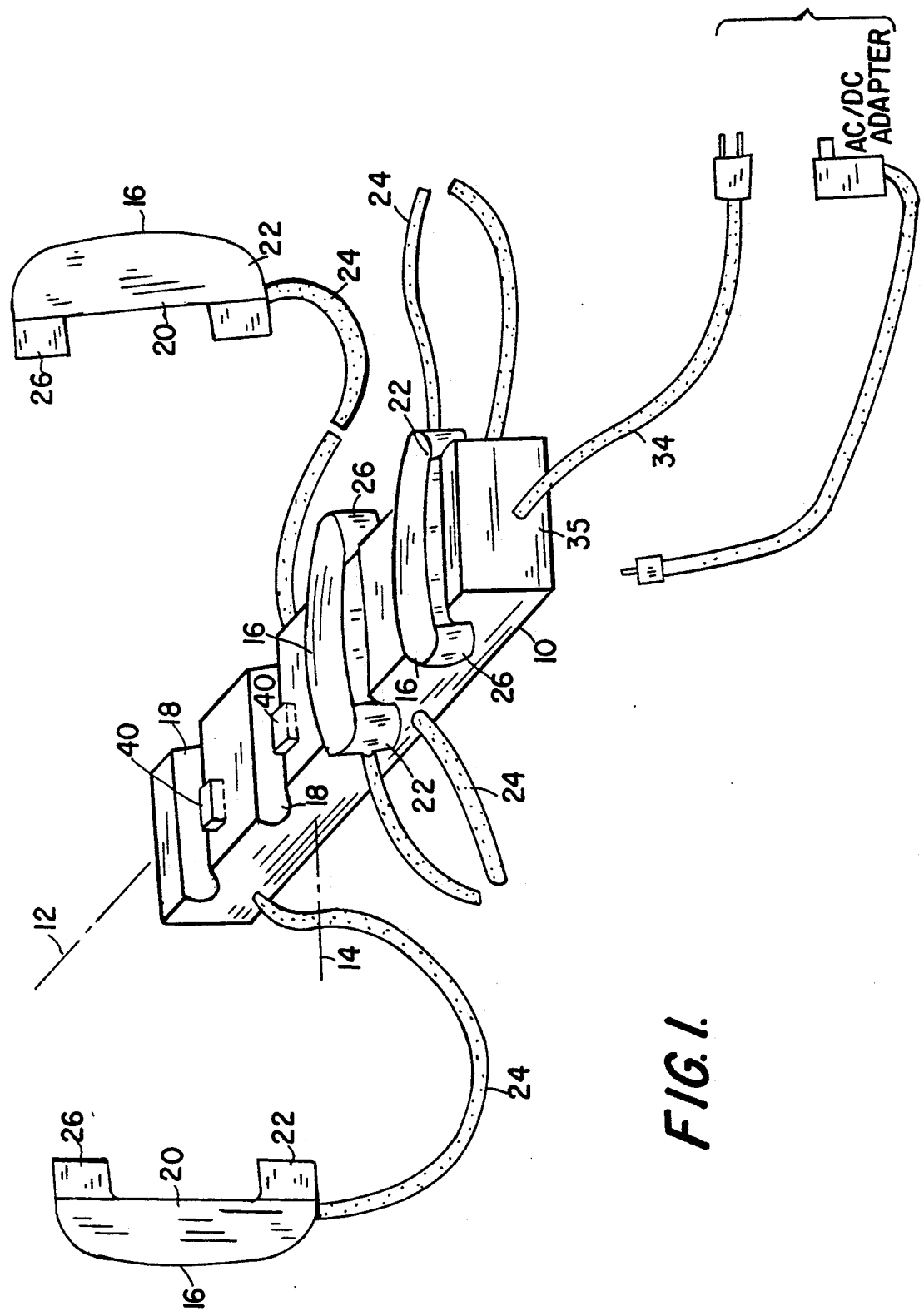
FIG. 1 is a perspective view of an apparatus embodying my invention.

FIG. 1 shows an apparatus of the present invention, comprising an elongated box 10 adapted to be placed on a desk or table surface to assume a stationary position between a speech therapist (instructor) and one or more students. The elongated box has a longitudinal axis 12, and a transverse axis 14. The upper face of box 10 has four transversely extending grooves (depressions) therein that form saddles for supporting individual telephone handsets 16.

In FIG. 1 two of the handsets 16 are shown from box 10, and two of the telephone handsets are shown resting in individual saddles (grooves) in the box upper face. The individual saddles are designated by numerals 18. Each telephone handset 16 has end portions thereof overhanging the longitudinal sides of box 10 when the handset is supported in an inactive standby position on one of the saddles.

Figure 2:
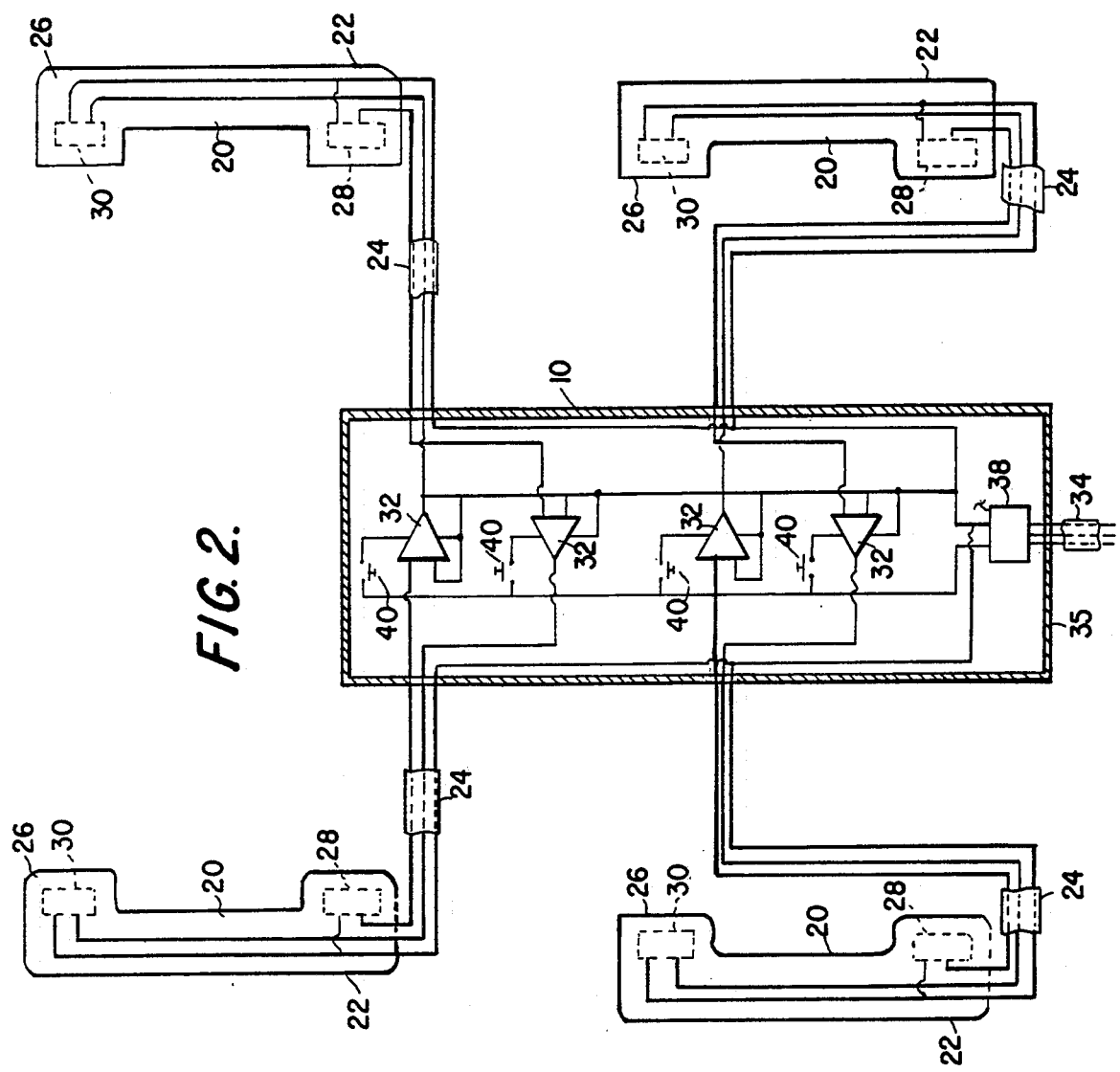
FIG. 2 is a schematic representation of an electric circuit used in the FIG., 1 apparatus.

Each handset comprises an elongated housing 20 having one end 22 thereof connected to a flexible signal cord 24. A microphone is located within end 22 of each handset housing. A speaker (receiver) is located within the other end 26 of each handset housing. In FIG. 2 each microphone is indicated by numeral 28, and each speaker is indicated by numeral 30. Signal cord 24 contains (houses) wiring that connects the various microphones 28 and speakers 30 to an amplifier 32 in box 10.

The wiring system is such that each microphone 28 is connected to the input of individual amplifier 32, and each speaker 30 is connected to the individual amplifier output. Power for the signal amplification process may be taken from the household current source through a power supply cord 34 that extends from a transverse end 35 of box 10.

As shown in FIG. 2, the electric wiring within cord 34 connects with the input terminals of a voltage step-down transformer 38 located within box 10. The low voltage terminals of the transformer supply operating current to all amplifiers 32. The wiring is such that when a handset 16 is removed from its cradle (saddle) 18 it is in condition to receive an audible signal at its speaker 30 or send an audible signal through its microphone 28. Each microphone feeds into individual amplifier 32, and each speaker takes an amplified signal from the individual amplifier. The system is thus usable by the hearing-impaired.

A depressible push-button switch 40 can be mounted in each saddle for actuation by the associated handset 16 so that when the handset is resting on the saddle the switch is in a circuit-open condition, and when the handset is lifted off the saddle the switch is in a circuit-closed condition. A handset becomes active only after it has been removed from its saddle.

The various signal cords 24 extend from the longitudinal sides of box 10. The cords are staggered or alternated so that one cord extends from box 10 to the left, and the next cord extends from box 10 to the right. The number of handsets can vary, depending on the number of students in double that are expected to use the training device. It is contemplated that as few as two handsets or as many as eight handsets will be used. Box 10 will be sized according to the number of handsets.

In use of the training device, box 10 will be located at a central point on a table or desk, with the instructor and the students sitting along opposite edges of the desk in facing relation to each other and to box 10. By having alternate ones of cords 24 extend in alternate directions it becomes practicable for the instructor and students to sit facing one another without requiring any of the cords to be drawn across the upper face of box 10. In the FIG. 1 illustration two persons will be sitting to the left of box 10 and two persons will be sitting to the right of box 10. Cords 24 can be relatively short, e.g. less than three feet long.

As previously noted, the speech therapy (instructor) involves the instructor using one of the handsets for speaking purposes, to show by example proper word pronunciation, grammar and sentence structure. A student responds by repeating the instructor's words and/or by answering questions posed by the instructor. Each student operates his/her own handset in each separate party line fashion, i.e., voice messages correspondence to the opposite participant are heard by each of the other participant. The students learn by alternately speaking and listening in a "learn by doing" format. The objective is of course to improve the students' telephone skills so that in time each student will have the skill to use a conventional telephone. It will be noted that the training device is to enhance the students' awareness of the errors thereby accelerating the learning progress. The same system applies to the hearing-impaired students with the above-described telecommunication device for the deaf. Since the training device uses household electric current the operating costs are relatively low. There are no payments to the telephone company.

Figure 3:
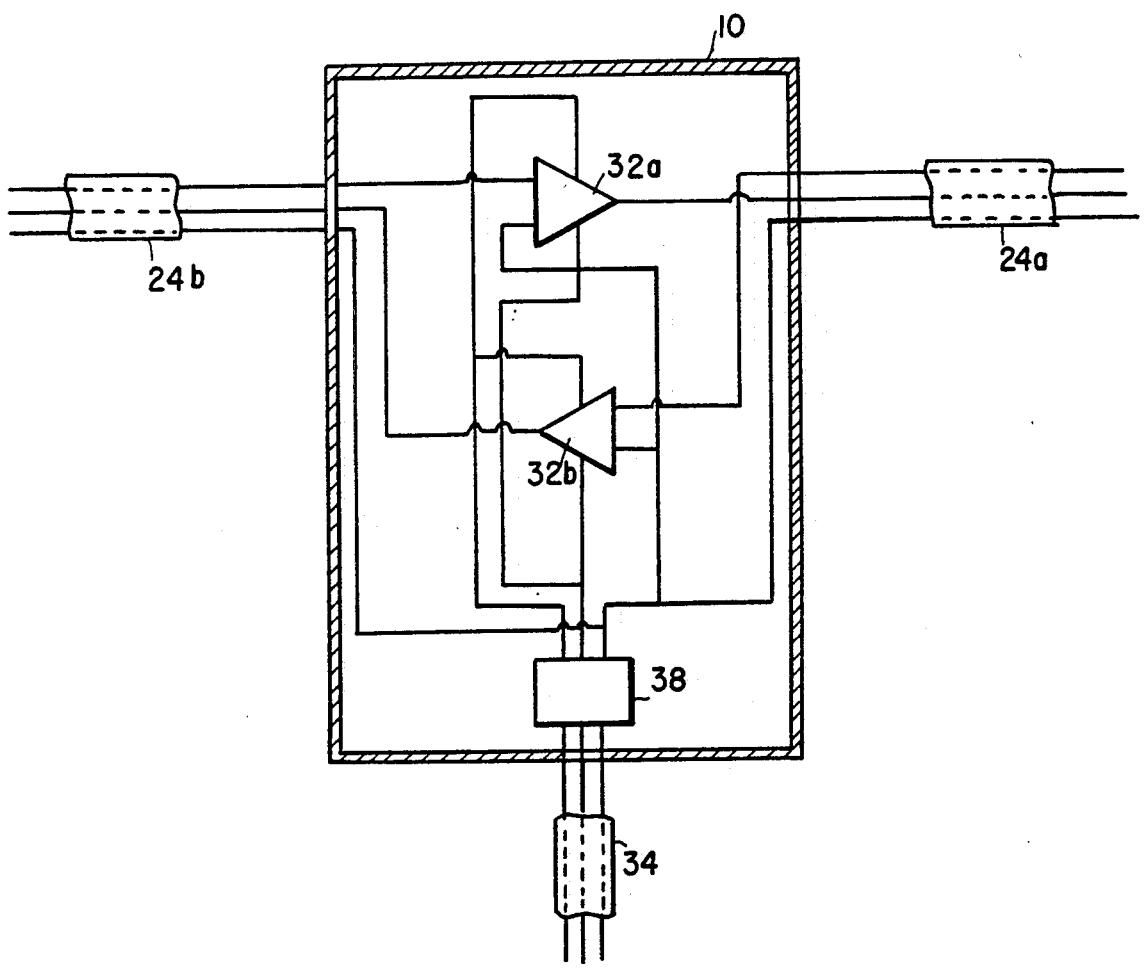
FIG. 3 is a view similar to FIG. 2, but illustrating another embodiment of the invention.

FIG. 3 shows a basic arrangement wherein two individual handsets are connected to individual amplifiers 32a and 32b via wiring in flexible cords 24a and 24b. The handset associated with cord 24a has its microphone wired to the input of amplifier 32b; the output of amplifier 32b connects with the receiver in the other handset via wiring running within cord 24b. The handset associated with cord 24b has its microphone wired to the input of amplifier 32a; the output of amplifier 32a connects with the receiver in the rightmost handset via wiring within cord 24a.

The training device of FIG. 3 is a two-person, two-way communication system, wherein the instructor speaks/listens at one handset and the student speaks/listens at the other handset. The system could be expanded to have more amplifier-handset combinations, e.g. four, six or eight combinations.

I claim:

1. A telephone speech training device, comprising a box adopted for placement on a table top, said box having a horizontal length dimension defining a longitudinal axis and a horizontal width dimension defining a transverse axis; said box having an upper face; a plural number of upwardly facing saddles spaced apart along said box upper face in the direction of the box longitudinal axis; each saddle comprising a groove extending parallel to the box transverse axis along the box upper face; a plural number of telephone handsets, one for each saddle; each saddle being configured to underlie and support a telephone handset in an inactive standby position; each handset comprising an elongated housing, a microphone located in said housing at one end thereof, and a speaker located in said housing at the other end thereof; a number of individual amplifiers in said box, each said amplifier having an input and an output; first wiring connections between each microphone and an amplifier input; second wiring connections between each speaker and an amplifier output; a flexible signal cord extending from each telephone handset to a point on the box in the vicinity of the saddle for the respective handset; each flexible signal cord containing a first wiring connection associated with the respective microphone, and a second wiring connection associated with the respective speaker; a power supply cord extending from the box for connection to a household outlet; and electrical connections within the box between the power supply cord and the amplifiers for supply current to said amplifiers; said flexible signal cords and said amplifiers constituting the sole electrical links between the various handsets.

2. The training device of claim 1, wherein each saddle-forming groove has a length less than the length of the associated handset, whereby the handsets are caused to overhand the longitudinal sides of the box when in their inactive standby positions; each flexible signal cord extending through a longitudinal side of the box; alternate ones of said flexible signal cords extending through alternate ones of the box longitudinal sides.

* * * * *